E. W. THOMPSON.
EARTH-CLOSET.
No. 192,096. Patented June 19, 1877.
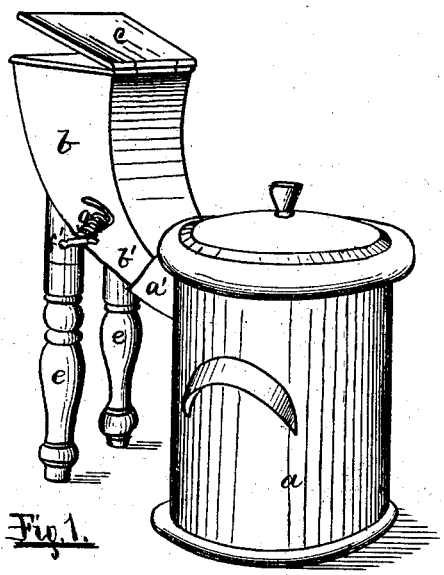
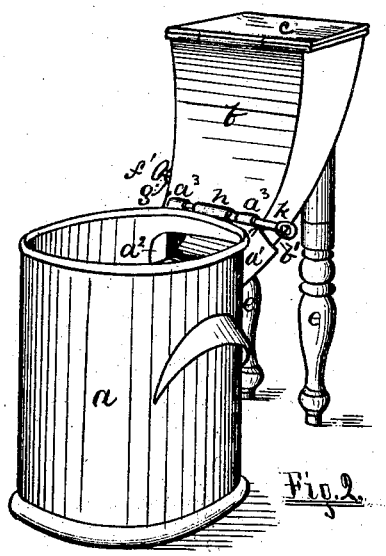
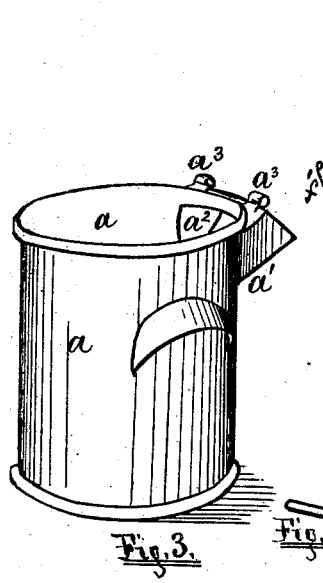
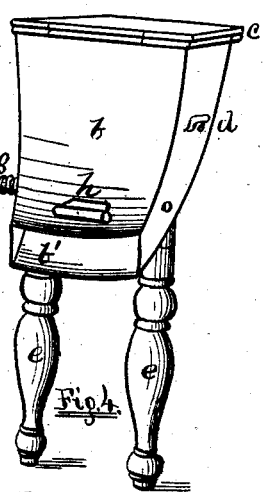
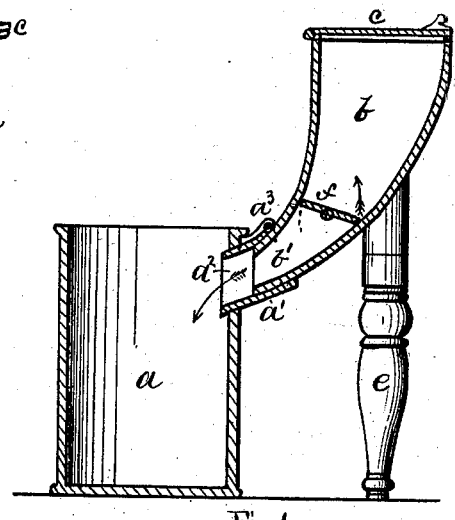
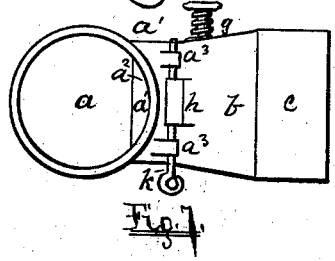

UNITED STATES PATENT OFFICE.

ELIAS W. THOMPSON, OF BROOKLYN, NEW YORK.

IMPROVEMENT IN EARTH-CLOSETS.

Specification forming part of Letters Patent No. 192,096, dated June 19, 1877; application filed February 14, 1876.

*To all whom it may concern:*

Be it known that I, ELIAS W. THOMPSON, of the city of Brooklyn, county of Kings, and State of New York, have invented a new and Improved Earth-Closet, of which the following is a specification.

My earth-closet is intended to be portable, and set up any where desired, and especially adapted for use in city bed-chambers.

The nature of my invention consists in the combination of a receptacle or reservoir for earth, ashes, disinfecting compound, &c., with a proper pail, jar or other suitable vessel for personal use, arranged so that any one may readily sit thereon.

The earth-reservoir is provided with a turning valve, regulating and controlling the supply of earth, &c., with stem and handle, and is opened by hand, but provided with a spring arranged to shut or close the said valve automatically.

The reservoir is also provided with legs, upon which it rests, and chute to direct the dirt properly into the privy-vessel.

The vessel is intended to be separated from the earth-reservoir whenever desirable for emptying, &c., and when united with the reservoir the union is secured by a bolt or rod running through proper eyes, &c., and is provided with chute, connecting with chute of reservoir by fitting outside the same, so as to form a continuation thereof.

Figure 1 is the closet complete in perspective, showing the handle side. Fig. 2 is a perspective view of the same. Fig. 3 is the privy-vessel alone. Fig. 4 is the earth-reservoir alone. Fig. 5 is the connecting-bolt alone. Fig. 6 is a vertical section of the whole apparatus complete; and Fig. 7 is a horizontal view of the apparatus complete.

$a$ represents the pail, jar, or other utensil upon which the person sits. It is provided with suitable rim at top, and cover or lid; also handles at the side, so that it may be removed to empty, clean, &c.; also having aperture at $a^2$, with chute $a^1$, and bolt-eyes at $a^3$. $b$ represents the earth receptacle, provided with cover $c$ at top, handles $d$ at sides, legs $e$ at or underneath bottom.

At $f$ is shown a turning valve, by moving of which the earth, &c., is allowed to slide down through neck $g$ into receptable $a$ when desired. A chute, $b$, is formed below the valve $f$, upon the top of which are eyes $h$, and a connection is made with vessel $a$ by passing the end of chute $b'$ into chute $a^1$ of vessel $a$, and running the rod or bolt $k$ through the eyes $a^3$ and $h$, as shown in Fig. 7.

What I claim as new, and desire to secure by Letters Patent of the United States, is, viz.:

1. The portable hopper $b$, provided with curved chute $b'$, and at its lower extremity legs $e$, also a valve, $f$, with handle and stem $f'$, the said stem having coiled spring $g$ connected therewith and with side of the hopper or its chute, and arranged to throw back the valve $f$ automatically as the power of the hand is removed, in combination with the portable pail or vessel $a$, connected to the hopper $b$ by bolt or rod $k$, permitting its removal when desired, the whole constructed and combined to operate substantially as shown and described.

2. The combination of coiled spring $g$ with stem $f'$ of valve $f$, and side of hopper or chute $b$ and $b'$, for the purpose of constituting the valve self-closing, as described and set forth.

3. The portable vessel $a$, provided with aperture $a^2$ to receive the chute $b'$, in combination with hopper $b$, connected therewith by bolt or rod $k$, substantially as shown and described.

ELIAS W. THOMPSON.

Witnesses:
JOHN INGLIS, Jr.,
R. H. REILLE.